(12) United States Patent
Leung et al.

(10) Patent No.: US 10,007,850 B2
(45) Date of Patent: Jun. 26, 2018

(54) SYSTEM AND METHOD FOR EVENT MONITORING AND DETECTION

(71) Applicant: Innovative Alert Systems Inc., Calgary (CA)

(72) Inventors: Henry Leung, Calgary (CA); Xiaoxiang Liu, Calgary (CA); Ha Nguyen, Calgary (CA)

(73) Assignee: INNOVATIVE ALERT SYSTEMS INC., Calgary (CA)

( * ) Notice: Subject to any disclaimer, the term of this patent is extended or adjusted under 35 U.S.C. 154(b) by 0 days. days.

(21) Appl. No.: 13/998,728

(22) Filed: Nov. 29, 2013

(65) Prior Publication Data

US 2017/0344832 A1   Nov. 30, 2017

Related U.S. Application Data

(60) Provisional application No. 61/797,001, filed on Nov. 28, 2012.

(51) Int. Cl.
| | |
|---|---|
| *G06K 9/00* | (2006.01) |
| *G08B 21/04* | (2006.01) |
| *G06T 7/292* | (2017.01) |
| *G06T 7/90* | (2017.01) |
| *G06F 17/30* | (2006.01) |

(52) U.S. Cl.
CPC ... *G06K 9/00771* (2013.01); *G06F 17/30286* (2013.01); *G06K 9/00342* (2013.01); *G06T 7/292* (2017.01); *G06T 7/90* (2017.01); *G08B 21/043* (2013.01); *G08B 21/0476* (2013.01); *G06T 2207/30196* (2013.01); *G06T 2207/30241* (2013.01)

(58) Field of Classification Search
CPC ..................... G06T 7/2033; G06T 7/20; G06T 2207/10016; G06T 7/90; G06K 9/3233; G06K 9/00777
See application file for complete search history.

(56) References Cited

U.S. PATENT DOCUMENTS

| | | | | |
|---|---|---|---|---|
| 8,456,293 B1* | 6/2013 | Trundle | ............ | G08B 21/0423 340/517 |
| 9,449,229 B1* | 9/2016 | Laska | ................ | G06K 9/00765 |
| 9,646,482 B1* | 5/2017 | Herman | ............... | G08B 25/008 |

(Continued)

*Primary Examiner* — Amir Alavi
(74) *Attorney, Agent, or Firm* — Mu P.C.

(57) ABSTRACT

A system for event detection and reporting has primary sensors for producing raw data from observing the proximate area, one or more processors for the primary sensors, for processing the raw data to produce output, a centralized controller to which each of the processors is connected, for receiving the output, a security network for communicating between the sensors, the controller, and one or more remote terminals, the security network having an alarm, and a plurality of auxiliary sensors for providing secondary sensor information to the one or more processors wherein the controller provides an alarm to the remote terminals through the security network if an event has occurred. A method of event detection has the steps of receiving a control command, alarm message and sensor information, determining if an event has occurred, and sending alarm messages and filtered sensor information to remote terminals if an event has occurred.

17 Claims, 14 Drawing Sheets

(56) References Cited

U.S. PATENT DOCUMENTS

| | | | |
|---|---|---|---|
| 2004/0075738 A1* | 4/2004 | Burke | G08B 13/19656 348/143 |
| 2005/0162515 A1* | 7/2005 | Venetianer | G06F 17/3079 348/143 |
| 2015/0052578 A1* | 2/2015 | Yau | H04W 12/00 726/3 |
| 2017/0213447 A1* | 7/2017 | Horrocks | G08B 29/185 |

* cited by examiner

|   | W | T | L |
|---|---|---|---|
| W | $p_{(W,W)}$ | $p_{(W,T)}$ | 0 |
| T | $p_{(T,W)}$ | $p_{(T,T)}$ | 0 |
| L | 0 | 0 | 0 |

SYSTEM AND METHOD FOR EVENT MONITORING AND DETECTION

FIELD OF THE INVENTION

The invention relates to event detection systems, and in particular, fall detection using a decision support engine.

BACKGROUND OF THE INVENTION

While some existing systems of fall detection are based on a wearable device (e.g., body attached accelerometers and gyroscopes), they monitor the movements of an individual by recognizing a fall and trigger an alarm. These devices, however, require an individual to wear them all the time and tend to trigger false alarms for normal daily activities. Other fall-detection systems require a person to call for help after falling down by pushing a button on a device, but such mechanism is impractical if the person becomes immobilized or unconscious after the fall.

There are significant advantages of using a non-intrusive monitoring system, such as using a video camera. A vision-based system needs to be capable of detecting various types of human behaviors for fall detection. In the literature, most of these systems rely on velocity/acceleration thresholding or single classifier to recognize falling activities. The robustness and effectiveness of these algorithms are frequently sacrificed in order to balance the trade-offs between false alarms and miss detections. Such systems, leading to a hard decision, are often resource-constraint. In many real world applications, a situation is frequently encountered that one cannot simply identify the exact behavior of an individual. For example, falling down due to unexpected reasons, lying down on the floor for rest, sitting and lying on a couch, picking up an object on the floor, sitting on the floor for exercise can always confuse even human observers. Not to mention the fact that a falling down can appear differently at different times due to different reasons.

Therefore there is a need in the art for an apparatus and method for fall detection systems which use a non-intrusive monitoring system that is able to detect exact human behaviors.

SUMMARY OF THE INVENTION

A system for event detection and reporting comprises a plurality of primary sensors for producing raw data from observing the proximate area, a one or more processors for the primary sensors, for processing the raw data to produce output, a centralized controller to which each of the processors is connected, for receiving the output, a security network for communicating between the sensors, the controller, and one or more remote terminals, the security network having an alarm, and a plurality of auxiliary sensors for providing secondary sensor information to the one or more processors, wherein the controller provides an alarm to the remote terminals through the security network if an event has occurred.

In other embodiments, each sensor has an embedded processor for processing sensor signals locally, and raw data is processed by the embedded processor. A knowledge base containing the contextual information of the scene for assisting the decision making process of the processor may also be present.

In an embodiment, the controller may comprise a sensor processing module which processes the sensor output, a recognition module in communication with the sensor processing module, for recognizing sub-scenarios to produce sub-scenario information, a situation assessment module for receiving sub-scenario information from the recognition module and determining if a recognized event has occurred, and a resource management module for allocating control commands.

In a further embodiment sub-scenarios are hierarchically organized to represent one or more events, and the controller further comprises a situation assessment framework for recognizing events, one or more models used for calculating parameters of a scene of interest, and one or more run-time decision feedback from one or more auxiliary sensors. The processors may perform detection level processing of raw data obtained from the sensors and contextual information of the knowledge base, wherein the human is detected and represented by a set of features. The processors may also perform feature level processing, wherein the raw data and context information are converted and extracted as abstract features; and wherein the abstract features are obtained from the contextual information.

The processors may perform situation assessment for high-level event recognition using multi-level classification. The processors may construct a state transition model to represent the possibility of transitioning from one state to another, the state transition model comprising two or more states are constructed to represent recognized sub-scenarios and the context information, one or more probability values are adapted to associate with each state as an initial state probability, one or more probability values are adapted to associate with each combination of two states indicating a probability of transition from the first state to the second state as the state transition probability, and one or more probability values are adapted to associate with each state indicating a probability of remaining in each state as another state transition probability.

The processors may recognize events by associating raw features and abstract features with characters representing one or more sub-scenarios, and the characters are associated with the events by one or more classifiers in the second layer. In an embodiment, the processors can compute a set of likelihood values from one or more classifiers in the first layer, the likelihood values are compared with each other in a comparator in the first layer, and the largest likelihood value and its associated state is selected.

In an embodiment, the processors may select a largest likelihood value by inputting a set of likelihood values from the buffer to one or more classifiers in a second layer, calculating a set of likelihood values from one or more classifiers in the second layer, and comparing the likelihood values with each other in the comparator, and selecting the largest likelihood value and its associated sub-scenario.

The system may further comprise a rule engine having primitive event rules, interaction event rules, sub-scenario rules and activity rules, which integrate with the knowledge base information.

Furthermore, each output of the situation assessment module may be given a confidence level of the detected event, which confidence level is adjustable by accumulating the probability values over a number of frames and determining one or more newly-detected sub-scenarios to support the confidence level. A detected confidence level may be lower than a predefined confidence threshold, the resource management module senses the status of all available resources and calculates an optimal utility plan for all available resources, and the resource management module allocates one or more list control command.

In an embodiment the processors perform sub-scenario level processing, wherein one or more sub-scenarios are recognized by one or classifiers and the subset of action items comprising one or more events are recognized. One or more processors perform higher level event processing formed by a sequence of sub-scenarios with proper context information, wherein one or more events are recognized using a multiple layer situation assessment processing.

Further described is a method of event detection and reporting, comprising the steps of receiving a control command from one or more processors, receiving an alarm message from the one or more processors, receiving sensor information from one or more sensors, the one or more processors determining if an event has occurred by considering one or more of the control command, the alarm message and the sensor information, the one or more processors sending one or more alarm messages and filtered sensor information to one or more remote terminals if an event has occurred, the one or more processors sending one or more control commands to a smart home controller if an event has occurred, and receiving decision feedback from a remote terminal, and directing one or more of sensor information, intermediately recognized events and control commands to the terminal to address the decision feedback.

In an embodiment the method has the further steps of analyzing the scene, detection and mapping an object, detecting motion, extracting features, detecting humans, reconstructing human body parts, and tracking multiple humans. In an embodiment, the method further comprises the steps of the one or more sensors having color and non-color sensor features detecting an object of interest falling out of the confidence interval of the range sensor, and a resource manager compensating for the loss of performance by means of fusing both color and non-color sensor features.

BRIEF DESCRIPTION OF THE DRAWINGS

The present invention will be thoroughly understood from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENT

Figure 1:
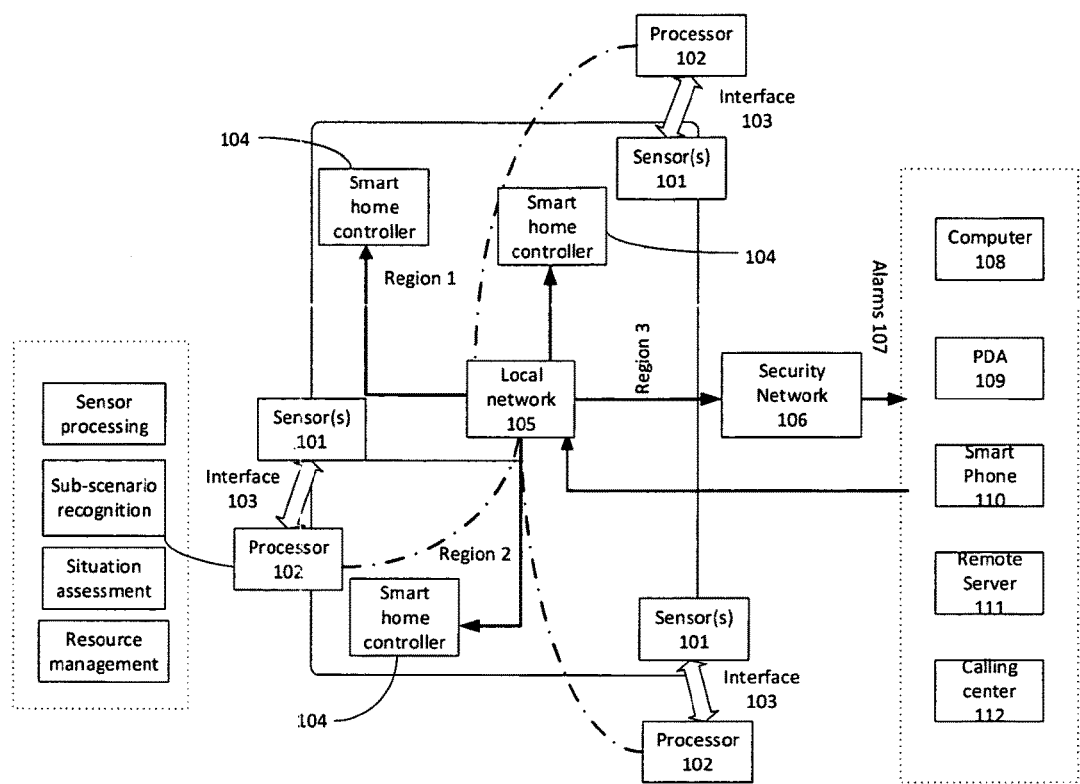
FIG. 1 shows a hardware composition and deployment of the video monitoring system in an embodiment of the present invention.

Methods and apparatus are disclosed for a real-time fall detection and human activity recognition system. The following description provides specific details for a thorough understanding of, and enabling description for, various embodiments of the technology. One skilled in the art will understand that the technology may be practiced without these details. In some instances, well-known structures and functions have not been shown or described in details to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

1 Decision Support Engine Overview

Reliable and accurate decisions can be made more reasonably by interacting with the environment and the entities to be monitored, to help the system to compile useful information from a combination of raw data, context, and knowledge, or pre-defined event models to identify the falling activities. In this invention, a Decision Support Engine (DSE) is used for an automated video monitoring system assisting an operator by observing and detecting people falling down in an indoor environment.

In accordance with the aspects of this invention, a decision support engine (DSE) 100 is employed to assist operators by observing and detecting people falling down in an indoor environment. The overall system architecture of the DSE 100 is presented in FIG. 1 as an embodiment of configuration. A sensor network consisting of sensors 101 (e.g., optical cameras or/and acoustic transducers) is placed in an indoor environment to detect a person's fall down activity. General deployment involves one sensor placed in each non-overlapped region in order to cover the maximum area while reducing the total number of sensors to be placed (i.e., the cost of deployment). The sensor 101 may be a single webcam, an IP camera, a depth sensor, a range sensor, a thermal sensor, or multiple calibrated cameras to perform stereo vision, with possibility of other integrated sensors such as microphone arrays, infrared sensor, or LED lighting. In one embodiment each sensor 101 is coupled with an on-board embedded processor 102 and in another embodiment the processing is performed by a personal computer, a remote server such as a cloud server to process the raw sensor data via the data transmission interface 103. The interface 103 may be any means of data communication known in the art such as USB, IEEE 1394, Bluetooth, wired or wireless LAN, WiFi etc. All sensors in the network are connected through a locally centralized controller (e.g., a router) 105 which offers the following key functions:

1. receiving control command from the processor 102;
2. receiving alarm message 107 from the processor 102;
3. receiving filtered video/sensor information from each sensor 101;
4. the processor 102 determining if an event has occurred;
5. Sending alarm message 107 and filtered video/sensor information to a number of remote terminals 115 via a secured network 106 if an event has occurred, and if no event has occurred the system continues to read sensor information;
6. Send control command to the corresponding smart home controller 104; and
7. Receive decision feedback from remote terminals 115 (for example, "scene too dark") and direct sensor information, intermediately recognized events and control commands to the controller 105 for resource management (for example, illuminating the scene) in order to address the decision feedback. As a further example, when a suspicious falling is detected but requires further confirmation, the resource manager will enable a zooming feature of a camera to see the face of the human, or trigger another sensor at a different viewing angle to compensate for the present sensor. The resource management is described in further detail in Section 4 below. The remote terminals may include one or multiple desktop/laptop computers 108 in an emergency calling center 112, a personal digital assistant (PDA) device 109, a cell phone 110, or a remote server 111 (e.g., a cloud server) etc. The message 107 may be composed of a text message, a securely coded video, an email or a phone call, for examples.

An example of receiving the decision feedback is when an alarm, triggered at 85% probability of a fall event, is detected and then sent via central controller 105 to one of the remote terminals 115, e.g., a remote computer, the human operator in front of the computer will be able to see the video of the detected scene. He may not be able to see clearly what is transpiring within the scene, and sends feedback (i.e., too dark) to the controller 105. The controller 105 will then allocate a resource, sending a command 'TURN ON THE LIGHT' to a smart home controller 104 to turn the lights on. The decision feedback loop further determines the probability of falling down based on the new information, wherein the scene is lighter or more colorful after the light has been illuminated. As a result of the more complete information, the decision may change, for example the fall probability decreases from 85% to 60%, with the result that no alarm is triggered With reference to FIGS. 1 and 2, in one embodiment, the DSE is implemented within the processor 102, which may be on-board or external, wherein the DSE consists of three fundamental processing modules (FIG. 2): (1) Sensor processing 203 (2) Sub-scenario 207 comprising recognition 204 and situation assessment 205 and (3) Resource management 212. Sensor processing module 203 takes sensor data 201 created by the sensor 101 based on the sensor's 101 observation of the dynamic scene of interest 202 in real time, sent via the data transmission interface 103 to the sensor processing module 203. Sensor data 201 may then be converted into digital format before being processed in the sensor processing module 203. Sensor processing module 203 carries out a sequence of signal processing algorithms including de-noising, motion detection, human detection, object recognition, human tracking which identifies individual humans in a scene and is detailed further in section 2.6 below, as well as feature extraction in order to provide a set of features 206 as the input to the sub-scenario recognition module 204. The extracted features 206 encapsulate the abstract information, which is key to the event of interest (for example, a fall down event, or events like lying on the floor, bending, walking, exercising, or sitting on a chair, couch or floor). Sub-scenario recognition module 204 processes the features and produces a set of sub-scenarios 207 recognized by one or more classifiers. The sub-scenarios 207 are treated as a group of lower-level representations of a higher-level event (described in more detail in sections 3.2 and 3.3 below), e.g. a fall, and then input to and processed by the situation assessment module 205 As an example, sub-scenarios may include (in the fall detection applications) walking, standing, sitting on floor, sitting on chair, bending down, and holding an object. One or more classifiers are trained to recognize the list of sub-scenarios as the low-level atoms. How the sub-scenarios are used to recognize a higher level event is described in sections 3.2 and 3.3 below. The DSE 100 may also require a knowledge base 209 of context information to assist the sensor processing module 203, sub-scenario recognition module 204 and situation assessment module 205. The knowledge base 209 is independent from the DSE 100 and optional. For example, if the knowledge base 209 contains a map of the room to be monitored, including the location of the furniture such as bed and sofa for example, the DSE 100 can make better and more accurate decisions. In combination with the knowledge of a room layout, a decision rule will limit the human to "falling" on the floor, not the bed or sofa. In this way the knowledge base reduces false alarms and increases the reliability of event detection. According to one embodiment of this invention, the results of situation assessment module 205 may be a recognized event 208, an associated alarm 210 or the recorded and labeled information such as an annotated video sent to the operators 211. The operators 211, after receiving the information, may either confirm with current situation to initiate further action, or provide decision feedback 211 to the DSE and to request additional information in order to make further decision. Under the circumstances that additional information is required, the decision feedback 211 and the processing output are forwarded to the resource manager 212 on the fly, where a list of control commands 213 can be generated. According to the availability of sensors 201 and/or external resources 214 at the time of request, the resource manager 212 computes and allocates a list of controls in an optimal way so that additional information may be requested by executing these control commands 213 over sensors 201 and other external resources 214. The decision loop may repeat within the current frame until conditions are met to stop the loop. The requested information may be fed into the next decision loop, which is complementary to the DSE. The entire system is organized by a closed decision support loop aiming at real-time, robust, accurate and intelligent event recognition and decision-making.

2 Sensor Processing 203

Figure 2:
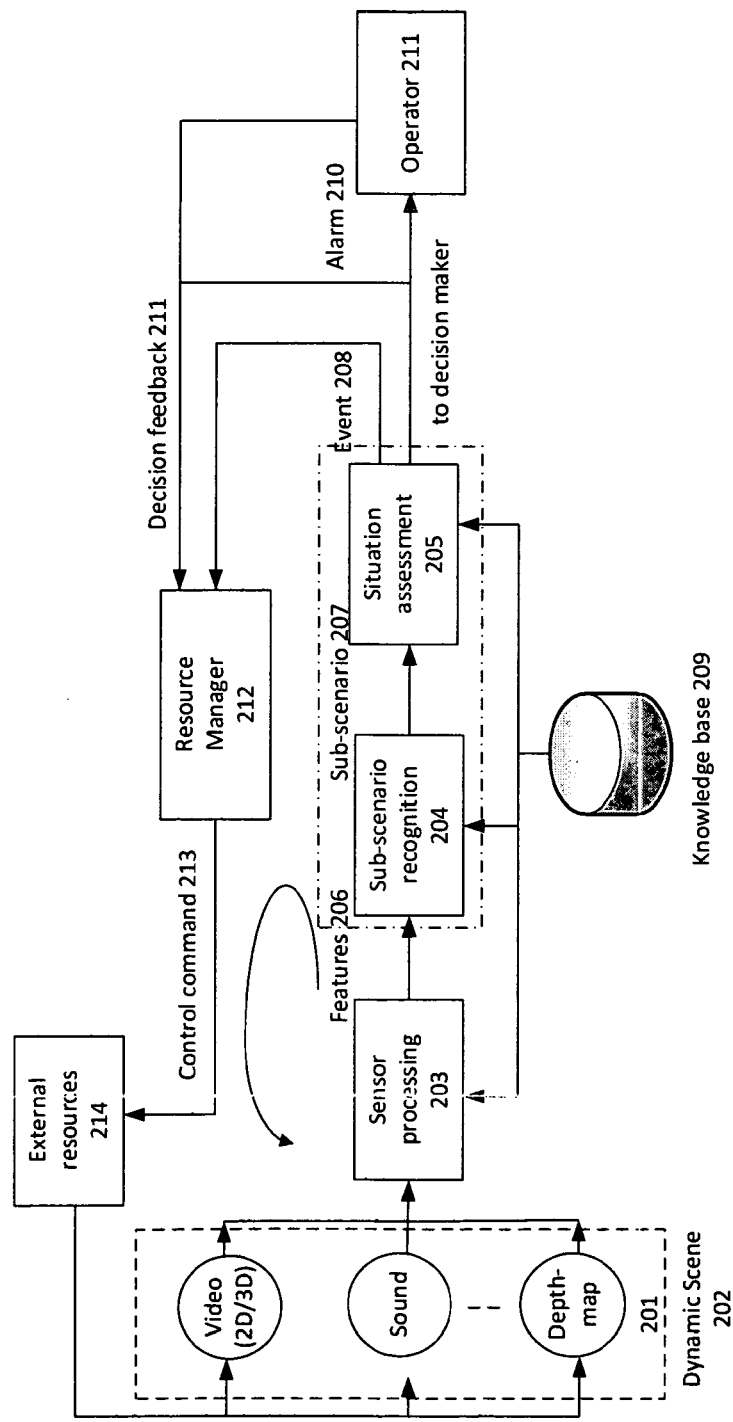
FIG. 2 shows a block diagram of the Decision Support Engine for fall detection in video monitoring in an embodiment of the present invention.
Figure 3:
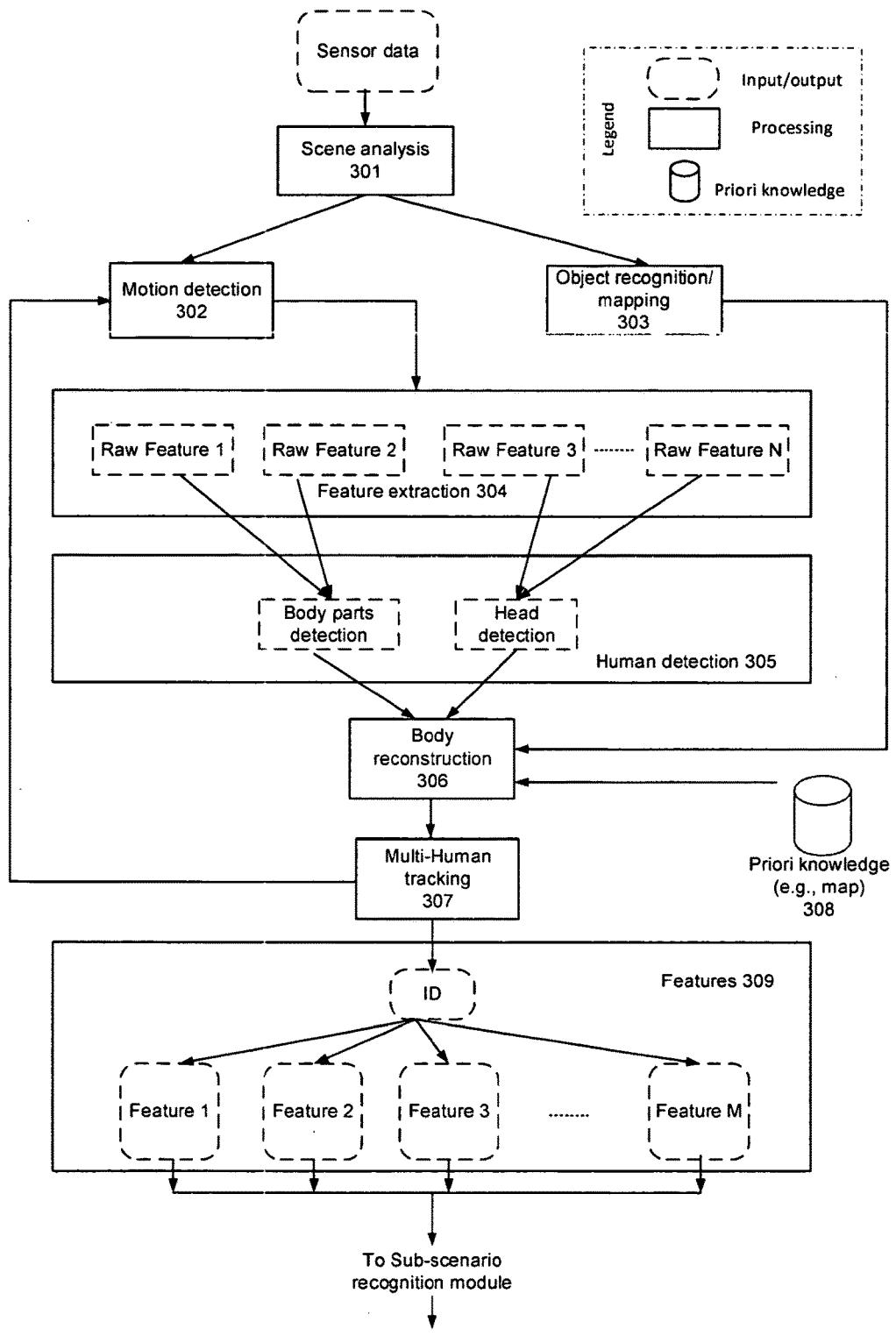
FIG. 3 shows a sensor processing module in an embodiment of the present invention.

With reference to FIGS. 2 and 3, sensor-processing module 203 takes raw sensor data 201, for example, depth/range map, 2D or 3D video, sound etc., to process with a series of image processing and computer vision algorithms to obtain a suite of features 206. The processing may consist of scene analysis 301, motion detection 302, object recognition/ mapping 303, feature extraction 304, human detection 305, body reconstruction 306, human tracking 307.

2.1 Scene Analysis 301

Due to the presence of constraints imposed by sensor resolution, coverage range, illuminating power, noise and uncertainty, the quality of raw sensor data 201 often varies as a function of geometry of the dynamic scene of interest 202 (e.g., the distance to the sensor). Without taking into account the sensor data dynamics in the DSE 100, the performance of subsequent sensor processing and advanced recognitions will be finally deteriorated. Scene analysis 301 offers a procedure of quantifying the sensor uncertainty and mapping it into a certain distribution. The resulting distribution map may serve as an 'uncertainty metric' towards the sensor in use and may further be incorporated to facilitate the subsequent 'adaptive' processing. For example, a depth image taken from a depth sensor usually presents an error distribution with respect to the scene geometry due to the fact that the random error of depth measurement increases with increasing distance to the sensor. To quantify the error distribution, the depth measurement may be modeled as a normal distribution with its standard deviation $\sigma_k$ calculated as follows:

$$\sigma_k = \frac{m}{f \cdot b} \sigma_d D_k^2$$

where m: a parameter for linear disparity normalization,
f: focal length,
b: base length,
$\sigma_d$: standard deviation of measured normalized disparity,
$D_k$: true depth of the point k in object space.

Figure 4:
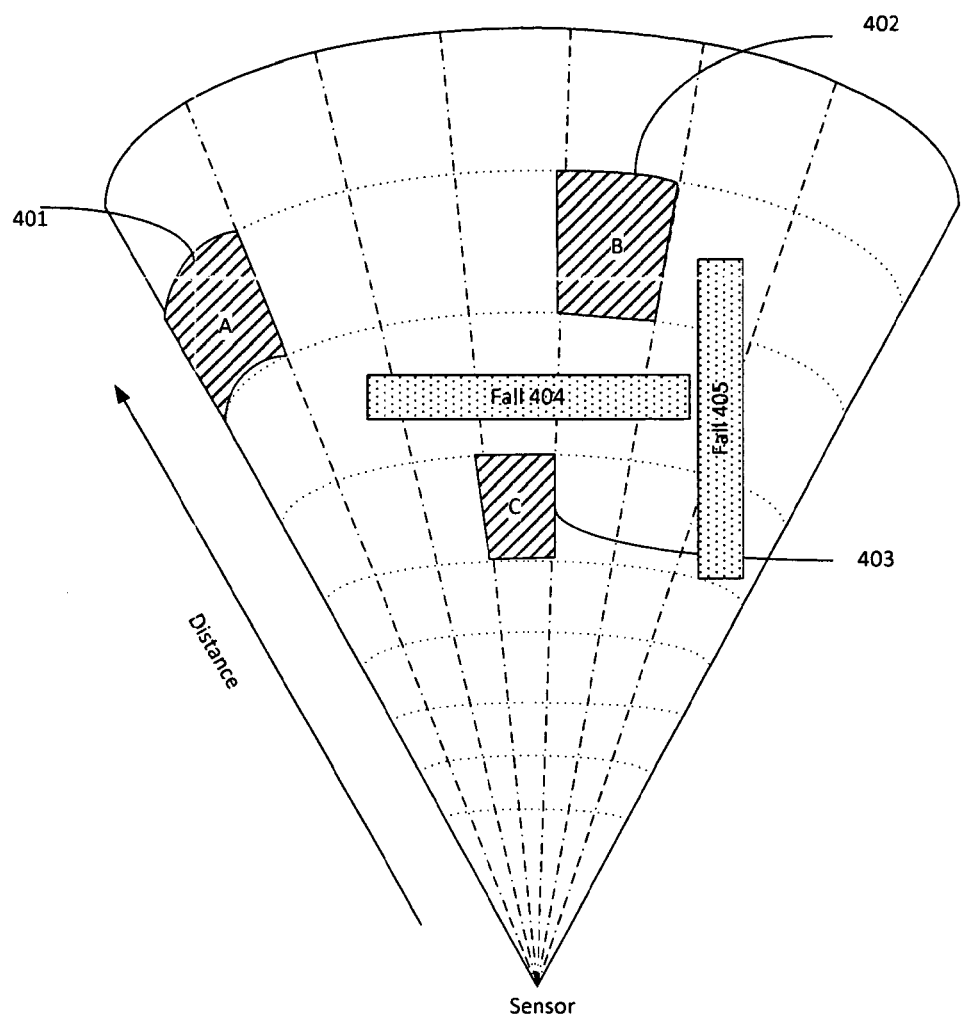
FIG. 4 shows a scene analysis for adaptive processing in an embodiment of the present invention.

FIG. 4 illustrates an example of sensor coverage. The coverage space forms a circular sector area 400 with the sensor in the center of the circle. In one embodiment of this invention, the entire area may be divided into k different contiguous patches (for example, 401, 402, 403) as shown in FIG. 4. Each patch is assigned with $\sigma_k$ as its uncertainty metric, where $D_k$ represents the true depth from the center of the k-th patch to the sensor position. It is noted that, for instance, the values of $\sigma_k$ for patch A 401 and B 402 are the same. And the value of $\sigma_k$ for patch A 401 or B 402 is higher than patch C 403. With this assignment, the subsequent algorithms take this uncertainty metric into account and process the depth-derived features in an adaptive fashion. For example, fall down 404 may be treated differently as fall down 405 since fall down 405 is associated with a set of different $\sigma_k$ while fall down 404 is constant in $\sigma_k$. Once this difference is captured, the recognition algorithm may apply an adaptive method to analyze the obtained features according to their associated uncertainty metric values. Scene analysis 301 can be performed in either an offline or an online mode. The scene analysis 301 in offline mode is carried out only once as long as the sensor coverage space is consistent during monitoring. On the other hand, the scene analysis 301 may also be implemented at each loop of event recognition. The on-line mode may be used when the associated 'uncertainty metric' is also dependent on the environmental dynamics such as lighting variations.

2.2 Motion Detection 302 and Human Tracking 307

Figure 5:
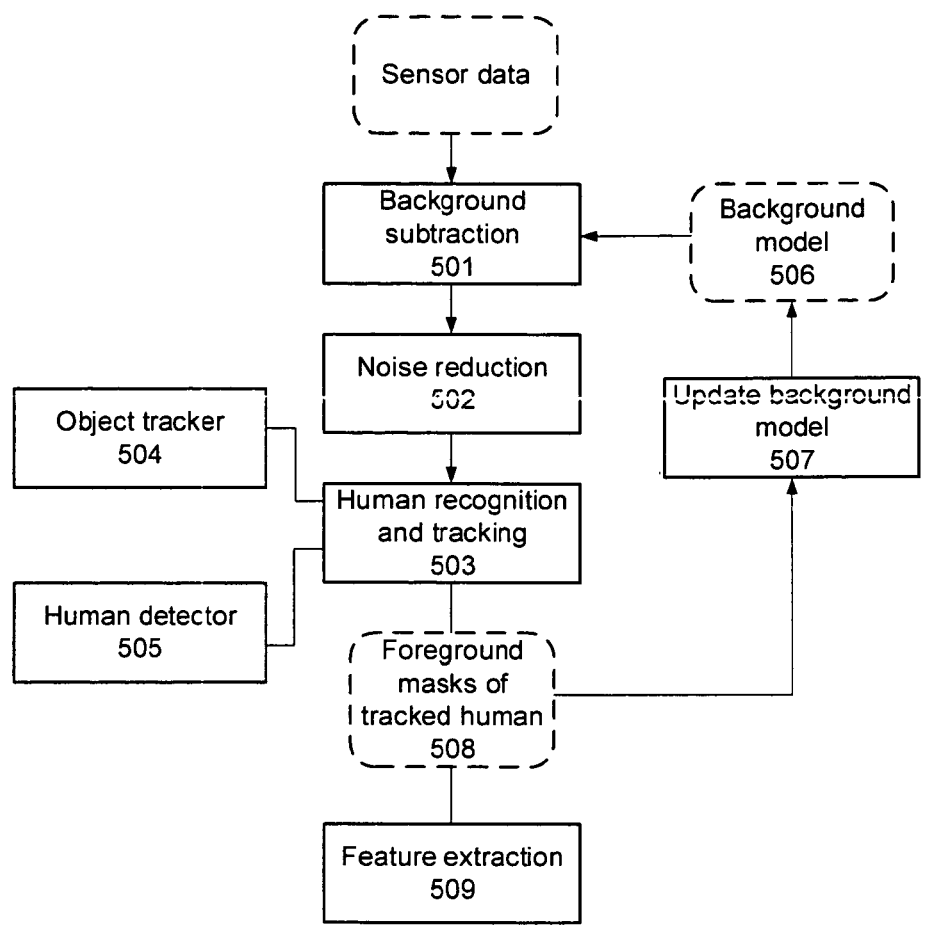
FIG. 5 shows a tracking feedback aided human detection and background subtraction scheme in an embodiment of the present invention.

Motion detection 302 in image sequence aims at detecting regions corresponding to moving objects such as human. After motion detection 302, the system generally track moving objects from one frame to another in the video sequence. The tracking usually requires considerable intersection with motion detection 302 during processing. In one embodiment of this invention, a tracking-feedback aided motion detection scheme is approach as illustrated in FIG. 5. In one example of such a scheme, a moving object is segmented from its background using a sequence of 2D images, depth images, or a combination of both.

The background subtraction 501 approach may be applied here to extract the moving object. For background subtraction 501 technique we maintain a background model 506 of the background. The construction and maintenance of background model 506 may be implemented using 'adaptive Gaussian Mixture Model (GMM)'. The foreground is detected by, pixel by pixel distance calculation and thresholding the current video frame and background model 506. For example, a depth image B is obtained from N background images. The mean value and standard deviation are computed for each pixel of the image, and used for segmentation. For each pixel (x,y) of the current image C, the pixel is considered as foreground if $|C(x,y)-B(x,y)| \geq G(x,y)$, with the threshold $G(x,y)$ equals to $\lambda$ times the pixel standard deviation (e.g., $\lambda=1.3$). When considering a typical indoor operating environment, shadowing effects may severely affect the motion detection 302 and the following fall detection performance. The shadow reduction algorithms in the background model 506 may be applied to remove the shadowing effects. The threshold $G(x,y)$, used to segment foreground from background, may be adaptive. For example, in low light or night vision mode (i.e., lower foreground/background contrast), the threshold $G(x,y)$, may be lower than that in day mode to allow more information to be included in the foreground mask (i.e., more sensitive to the small variations). The results will also increase the background noise. The noise reduction 502 may be performed immediately after the background subtraction 501. There are at least two types of noise present in the background image. The first one is salt and pepper noise originated from the illumination inconsistence between two adjacent frames. To remove this noise and to get better foreground mask we may perform a set of morphological and thresholding operations on the mask. One example of morphological operation may be an opening operation (i.e., an erosion which is followed by a dilation). Another example may be using median filtering and then applying a smoothing filter. After the noise is removed or reduced, a binary thresholding operation may be applied to convert the gray scale foreground mask to a binary foreground mask. The region of interest (ROI) in this foreground mask, for example, the human body may be divided into smaller sub-regions which will affect the continuity of the following feature extraction (e.g., blob detection or contour extraction), a set of morphological operations, such as multiple combination of dilations and erosions, may be applied in order to connect those sub-regions in foreground mask. The combination and parameters of morphological operations may be required to be adaptable to the remaining noise levels (after noise reduction 502) and the target foreground connectivity requirement. The second source of noise is random noise arising from the sudden lighting condition change or random but unwanted small moving object observed from the sensor. A thresholding filter may be applied to remove those small foreground regions which are considered as random noise, for example, connected foreground region smaller than a certain threshold will be removed. On another embodiment of this invention, the motion detection 302 can also depend on other techniques, such as temporal differencing and optical flow based motion detection.

The purpose of the proposed system is to detect human behaviors such as falling down activity so ideally the system will not consider other moving objects in the same scene. The human recognition and tracking 503 module will track multiple persons from the foreground mask and assign each person an ID to maintain the visibility and presence of its motion history and associated cues. The details of this part of processing will be illustrated later but the basic idea of processing involves a human detector 505 for human detection and a multi-target tracker 504 to track multiple presences of moving targets, including both human and other moving objects. As a result of this processing, a set of foreground masks of the tracked human are obtained.

One of the key innovations in the motion detection 302 is to introduce a tracking feedback loop for further background model updating 507 as opposed to the general top-down background subtraction approach. The conventional background subtraction relies on the background model 506 to be updated according to the motion cues, where all objects will be merged into the background if they are not moving within a certain number of frames. In our application, however, the presence of human is critical to the tracking and DSE so the maintenance of its appearance in the foreground mask is important regardless of its motion status. For example, human falling down may be detected based on the information including both while-falling and post-falling status, where human may not move in the post falling stage. In the proposed solution, the background model 506 is not updated using the entire image. But instead, the foreground mask 508 divides the entire image into foreground pixels and background pixels. In the foreground pixel set, we further divide the set into human foreground pixel sets and non-human foreground pixel sets. This division is dependent on the information from the human recognition and tracking 502, where the IDs of human objects are identified and maintained to distinguish between human and non-human foreground pixel sets. The background model update 507 may update the background model 506 only with the background pixels plus the non-human foreground pixels. As a consequence, the scheme ensures that the human will always be visible and remains in the foreground for feature extraction 509.

2.3 Object Recognition and Mapping 303

In some cases the system may need to recognize particular objects in the scene. One example of object recognition is to identify objects such as a walker and cane, which are moving with the human. Identifying these objects may assist the DSE to distinguish these cases from those involved with normal walking person so that a different set of detection rules may be applied to these special cases. Another example is to identify objects such as furniture (e.g., couch, bed and desk etc.) so that the location, boundary or area of the furniture may be used to handling occlusions where a person falls down but is partially or entirely occluded by these identified furniture. The object recognition may be executed by supervised learning and classification. One example of such a training process is to collect features extracted from the foreground image characterizing the target objects. The features may include shape, color, edge, texture etc. of the target objects and the classifier may be neural network (NN), fuzzy logic, decision tree, support vector machine (SVM), Bayesian learning or other statistical learning methods.

In other cases, the map of the monitored area may be obtained either by an automated mapping algorithm or by the priori knowledge 308 from users or software tools. The mapping information may include the door, wall, floor, ceiling, furniture as well as other information critical to comprise the scene layout. The mapping information not only serves along with the rule based decision engine to detect the event involved with human object interaction, but also help to handle occlusion cases by calculating the location of the tracked human in the map. In one embodiment of the invention, a floor plane may be detected by the V-disparity image approach. The V-disparity image computes the histogram of disparity values for each row of the depth image. The straight line corresponding to the ground plane can then be extracted by using the Hough transform. With the computed V-disparity image and the line corresponding to the floor plane, floor pixels can be extracted. With these pixels and their depth map, the 3D plane equation $ax+by+cz=z$ of the floor can be determined. The parameters a, b, c, and d can be computed using a least squares fit on the detected points. Therefore, the situation of whether a person is lying on the ground or not may be determined by calculating the distance between the human body and the floor plane.

2.4 Feature Extraction 304

Figure 6:
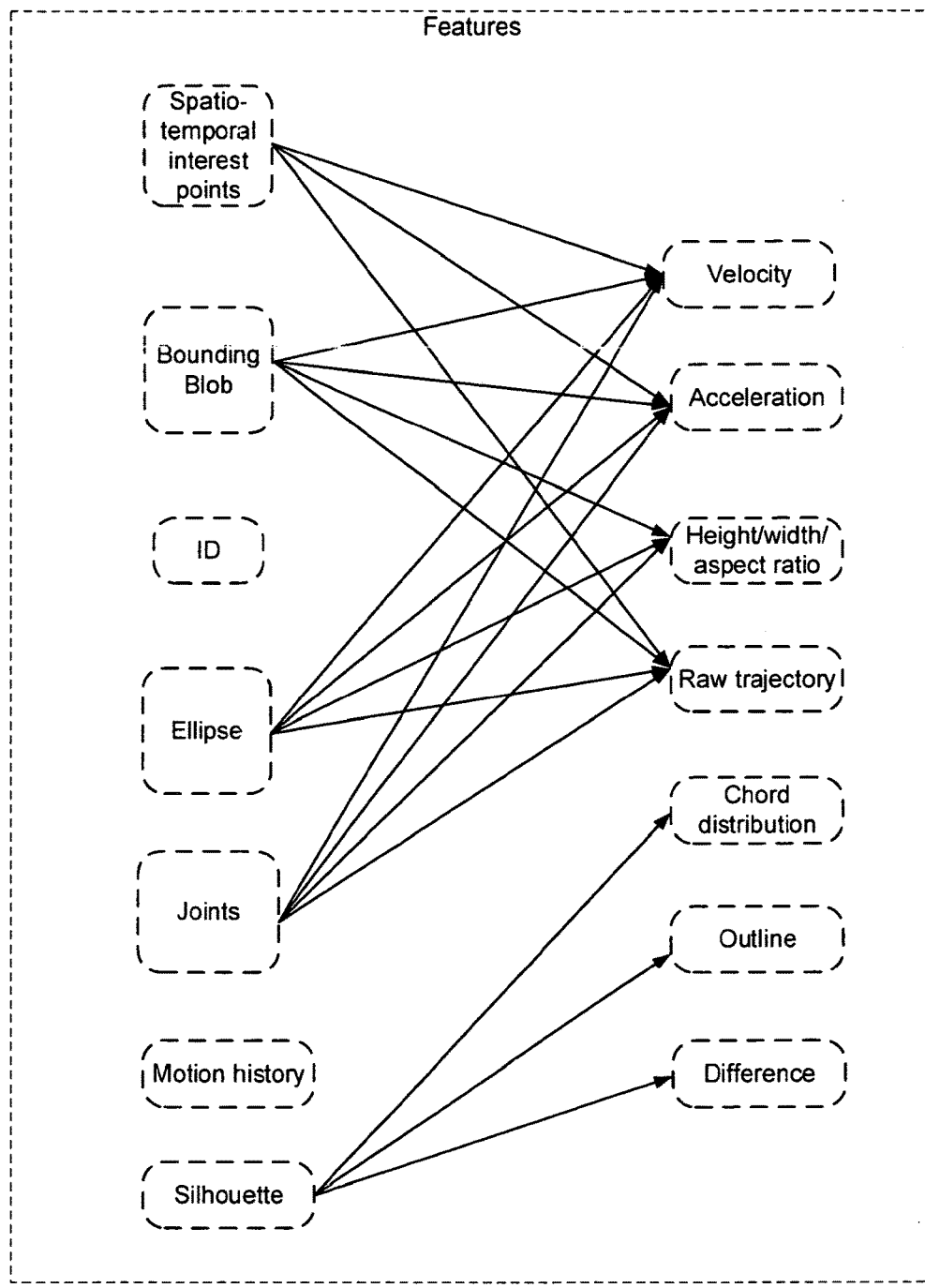
FIG. 6 shows a relationship of features at different extraction levels in an embodiment of the present invention.

The features may be extracted at different levels according to the stage of processing in which the feature is calculated. In one embodiment of this invention, raw features may be extracted right after motion detection 302 derived from the foreground images. For example, mathematical transformations may be applied to the foreground images to obtain the contour feature, edge feature, ellipse feature, Haar feature, histogram of oriented gradients (HOG) feature, etc. In another embodiment of example, raw features may be acquired after human tracking 307, where a set of object IDs, bounding blobs, motion trajectories are computed. The typical raw features used in DSE are listed below:

Blob
Bounding box position (x, y, z)
Velocity of height
Velocity of width/depth
Centroid position (x, y, z)
Skeleton (joints)
Position (x, y, z) for critical joints
Velocity for all cirtical joints
Trajectory (w.r.t. the blob centriod)
Angle change velocity
Raw trajectory
Normalized trajectory
Normalized polar trajectory
Velocity
Curvature
Vicinity
Shape (from silhouette)
Moments (e.g., center, orientation, length of major/minor semi-axis of an ellipse representation)
Deformation parameters
3D structure (from point cloud)
Voxel point (e.g., position, velocity, acceleration)
Surface (e.g., curvature and normal)
Shape
Keypoints Other raw features may include the spatial-temporal local interest points and spatial-temporal volume. The features used to distinguish between different activities are derived directly from these raw features. The relationship between these raw features and intermediate or end features are illustrated in FIG. 6. For example, from bounding box and silhouette, a set of velocity, acceleration, aspect ratio, and motion trajectory (e.g., centroid trajectory) features and a set of chord distribution, outline and motion difference features may be obtained, respectively.

Features may be composed of noise so that the filtering processing may be applied on them. In one embodiment of this invention, the smoothing techniques include median filtering, average filtering, Gaussian kernel filtering, and anisotropic diffusion etc. For example, a Gaussian kernel filtering approach is applied to each feature in the following manner:

Suppose the we have a trajectory feature $T_i$ defined by a set of n points corresponding to the successive position of the tracked human in the image sequence, which is $T_i=\{(x_1, y_1), \ldots, (x_m, y_m)\}$. Then we compute a kernel approximation of $T_i$ defined by:

$$u_t = \frac{\sum_{j=1}^{N} e^{-(\frac{t-j}{h})^2} x_j}{\sum_{j=1}^{N} e^{-(\frac{t-j}{h})^2}}, \text{ and } v_t = \frac{\sum_{j=1}^{N} e^{-(\frac{t-j}{h})^2} y_j}{\sum_{j=1}^{N} e^{-(\frac{t-j}{h})^2}}$$

where $u_t$ and $v_t$ denotes velocity with respect to $x_t$ and $y_t$, and h is a smoothing parameter to be set according to the noise magnitude.

Some features may not be scale invariant so that the normalization to these features is required to avoid ambiguity issues in fall detection. For example, centroid velocities extracted from the bounding box of a human at different distances from sensor may be quite different (i.e., smaller value as a person is farther away from sensor) although they characterize exactly the same activity. Normalizing the bounding box parameters with respect to a fixed reference box is necessary to remove the variations due to different geometrical setups.

2.5 Human Detection 305

Human detection 305 may be realized by human body detection or head detection or a combination of both. Human body detection may be implemented by detecting the full human body or by detecting body parts and assembly individual parts into a full body subsequently. In one embodiment of this invention, the full human body detection may be detected using the supervised learning where HOG feature and/or Haar feature are input to the training phase and cascade classifier and/or SVM classifier are employed in recognition phase. In another embodiment of this invention, the body parts detection is carried out first by applying a number of body part detectors (e.g., head, torso, arms and legs detectors) and then combining the responses of part detectors to form a joint likelihood model of a full human body. The joint likelihood model may also include an analysis of possible occlusion representations. The combined responses and the part detection responses provide the observations used for tracking 307.

In one embodiment of this invention, head detection can be executed as an integral part of human body detection using the head detector. In another embodiment of this invention, head detection can be realized by an independent process, where a head elliptical contour detection is implemented. Combining both detection responses within certain constraints may be possible to increase the reliability, accuracy and robustness.

2.6 Human Reconstruction 306 and Tracking 307

Human reconstruction 306 is a step prior to human tracking 307 to further differentiate between human and other moving objects (e.g., occlusions). In one embodiment, the body part detectors are employed to eliminate the moving regions which do not belong to a human. A set of skeleton points representing the key joints of a human body are fed to model each independent motion regions detected from the motion detection algorithm, The fitting dispersedness, along with other features such as the bounding box area, apparent aspect ratio, as well as the geophysical and temporal consistency constraints, are applied to the combine and reconstruct the human body parts from the body part detector responses. Bayesian combination may be used for the combination. After this, the human tracking process 307 is employed to continuously update the human motion regions. In one embodiment, an iterative tracking algorithm is applied in which an eigenbasis is used to represent the human being tracked. At successive frames, possible human locations near a predicted position are postulated according to a dynamic model. An observation model provides a maximum a posterior estimate of the human location, whereby the possible location that can be best approximated by the current eigenbasis is chosen. An inference model applies the dynamic and observation models over multiple past frames to predict the next location of the target object. Finally, the eigenbasis is updated to account for changes in appearance of the target human. In order to address the occlusion challenges, a sequential content adaptive occlusion analysis algorithm is used to determine the portion of the object that is occluded. It divides the ROIs into small blocks and scans the blocks one by one to determine whether the block is non-occluded, partly occluded or completely-occluded. Based on the block classification results, the template mask of the object was updated in the mean time. In order to overcome the template drifting problem, the covariance of the drifting noise has to be computed at each frame as occlusion proceeds. This is done by averaging the errors between the updated template and the one obtained from the estimated translation and scaling parameters. The drifting noise covariance is then used to rectify the estimated covariance of the measurement noise, which is resulted from a Kalman filter. With this algorithm, the Kalman gain is precluded from getting too large. Thus, the template drift can be significantly reduced.

3 Sub-Scenario Recognition 204 and Situation Assessment 205

3.1 Multi-Level Situation Assessment Architecture Design

Figure 7:
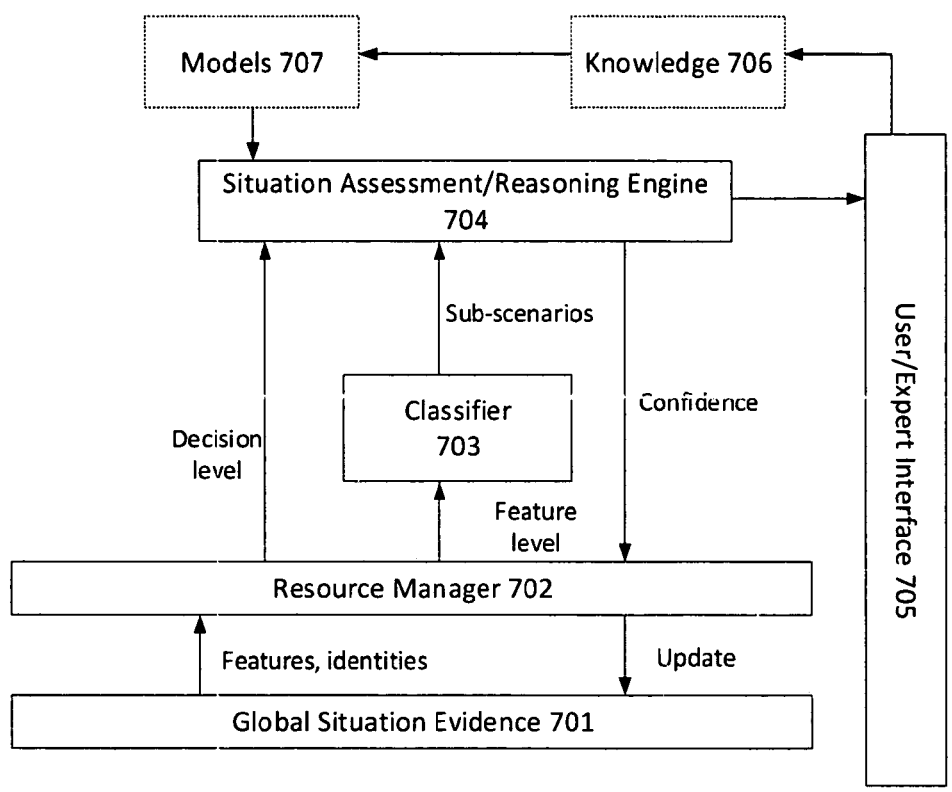
FIG. 7 shows a multi-level sub-scenario recognition and situation assessment module in an embodiment of the present invention.

In one embodiment, a schematic of the situation assessment and reasoning architecture is designed and shown in FIG. 7. In this framework, the DSE 100 runs sensor processing algorithms in background in order to obtain a set of global situation evidences 701 that may lead to low-level sub-scenario classes recognized by classifiers 703. The resource manager 702 selects and enables the resources/sensor to be used, and the selected sensors then generated features for the classifier 703 to use to recognize the specific sub-scenarios. The recognized sub-scenario classes are then fed into a higher-level situation assessment/reasoning engine 704 to provide the situation and reasoning about the current event, such as fall down. The knowledge base 706, offered either by priori information about the dynamic scene via one or more established models 707, or by run-time decision feedback user from operators and/or auxiliary sensory input from resource management engine via a user interface 705, will facilitate in situation assessment engine to generate real-time, robust and accurate event recognition. In such a multilevel hierarchical decision support architecture, the recognition process is directed bottom-up starting from the first level of sensor information such as position, velocity, orientation, shape of the objects. Feature level information obtained after the sensory processing acts as the building block for higher level abstraction. This design of the reasoning engine also supports decision level and class information that may be outputted by the sensory modules. Such decision level sensor information may be integrated into the situation assessment module at the second level decisions bypassing the classifier that generates sub-scenario classes.

In another embodiment, the DSE 100 may also require resource management 702 to allocate one or multiple resource(s) to obtain further information to update the confidence of the event from the previous decision. For example, the DSE 100 may forward the detected events to the operators according to the predefined confidence or threat severity level. Consequently, the identified alarming cases are marked with probability and presented with the help of a synthetic environment so that the operators can take the right action in a specific condition. The DSE 100 can also adjust its probabilities for future decisions considering the operator's feedback.

Figure 8:
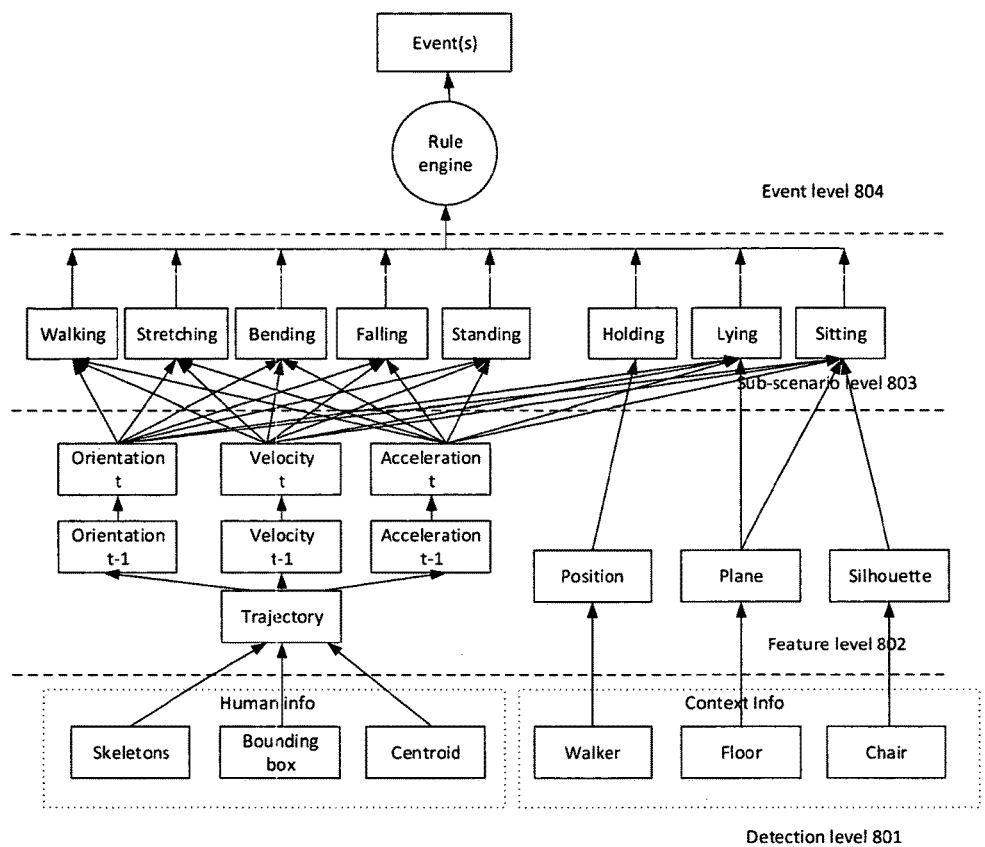
FIG. 8 shows an information abstraction and representation in situation assessment framework for fall detection in an embodiment of the present invention.

3.2 Information Abstraction and Representation in Multi-Level Situation Assessment for Fall Detection A hierarchical information abstraction and representation for fall-down detection in the DSE system is proposed and described in FIG. 8. The principle of the hierarchical framework is to enable the recognition of high-level, complex human activities based on the recognition results of multiple low-level simpler activities. The idea is to allow simpler sub-events that can be modeled relatively easily to be recognized first, and then use them for the recognition of higher-level events. The framework is composed of four levels representing how the information is processed at different level of abstraction, including, detection level 801, feature level 802, sub-scenario level 803, and event level 804. Detection level 801 processes information using the raw data directly from the sensors and prior knowledge. At this level, the human is detected and represented by a set of features. In one embodiment, these features consist of skeletons points, bounding box, and/or centroid of a human. On the other hand, the system may also obtain a set of prior information representing the environmental context, such as the detected floor points 801*a*, the shape and color of a walker 801*b*, or the size and shape of the chair/couch/table 801*c* in the room settings. At the feature level 802, the raw features and raw context information are converted and further extracted as processed features, which can be directly applied to the DSE. In one embodiment, these derived features may include the trajectory of the human centroid, the trajectory of the joints, the orientation, velocity and acceleration of trajectories. In another embodiment, the features may also include the structural representation of the shape of the human, such as the contour, curvature, vicinity, moments, and interest points. In another embodiment, the features obtained from the context may include the floor plane, the centroid of walker, or the silhouette of chair. At the sub-scenario level 803, a list of sub-scenarios is recognized by the proposed DSE, which forms the building blocks for a higher-level event recognition and situation assessment. The sub-scenarios are recognized the subset of the simplest action items comprising the target event (i.e., falling down) and other daily activities. For example, the daily activities may be decomposed into a sequence of sub-scenarios including walking, stretching, bending, falling, standing, holding, jumping, hand-waving, shaking, lying and sitting. A higher level event 804, which is formed by a sequence of sub-scenarios with proper context information, can be recognized by DSE with a situation assessment algorithm, In one embodiment, a high-level event of severe "fall down" may be recognized by detecting a sequence of 'walking', 'falling', 'lying on the floor'. A high-level event of normal 'resting' event may be composed of a sequence of 'walking', 'sitting on the floor/chair'. Therefore, in hierarchical representation, a high-level event (e.g., fall down) that the system aims to recognize is represented in terms of a series of its sub-scenarios (e.g., walking, falling, and lying (on the floor)). Specifically, the building-block activities that appear frequently in high-level human behavior are modeled as the low-level actions (i.e., sub-scenarios); and high-level human behavior are represented and recognized by concatenating them hierarchically.

3.3 Multi-Layered Situation Assessment Approach

In one embodiment, a multi-layered approach based on multi-level classifier is applied for situation assessment for high-level event recognition. The simplest case is a two-layer approach with one classifier at each layer. Depending on the complexity of the event to be recognized, the number of layers can be more than two. The classifier at each layer may be the same or different. For example, typical classifiers may include decision tree, support vector machine (SVM), Bayes, hidden Markov model (HMM) and its variations, and neural networks (NN). We use two layers for illustration and description purpose in the followings. We also denote the classifier at the lower layer is C1 and C2 at the higher level. In the first layer (i.e., lower level), C1 is applied to the low-level actions to deal with the temporal evolution and uncertainty propagation for individual states. In the second layer (i.e., higher level), the classic state diagrams require the formation of discrete nodes for every legitimate combination of parameters that define a situation. For the underlying falling down event, three states are used:

The pre-fall state: corresponds to daily life motions, such as walking, with occasionally sudden movements directed towards the floor like sitting down or crouching down.

The falling state: corresponding to a fall, is extremely short phase. This phase can be detected by the trajectory of the body towards the floor.

The post-fall state: is generally characterized by a person motionless on the floor just after the fall. It is also characterized by slow movement on the floor in case the person is crawling for help and trying to stand up to recover.

Figure 9:
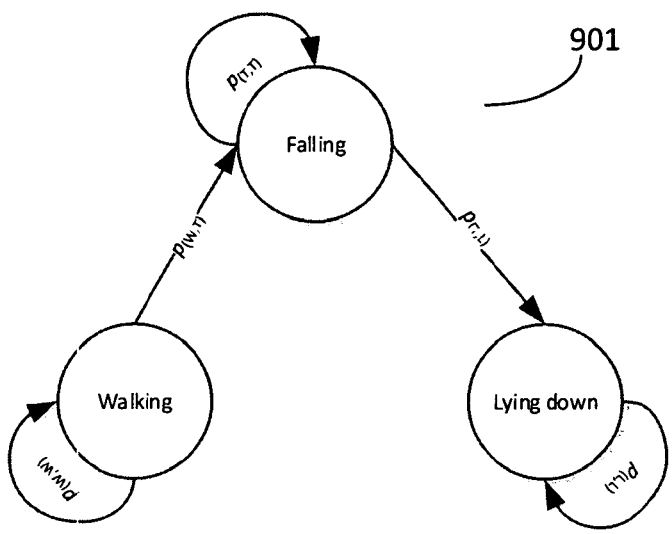
FIG. 9 shows a block diagram of state transition for falling down in an embodiment of the present invention.
Figure 10:
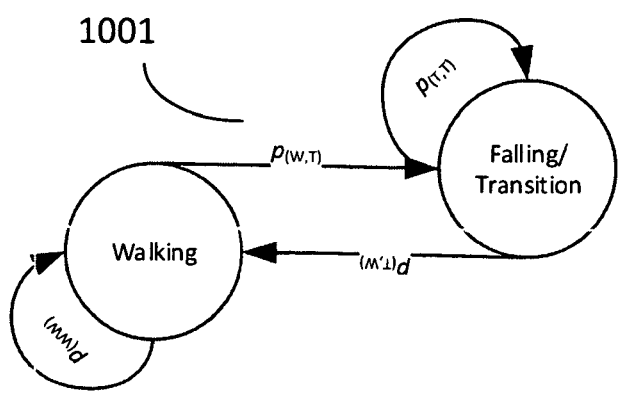
FIG. 10 shows a block diagram of state transition for sit-up in an embodiment of the present invention.
Figure 11:
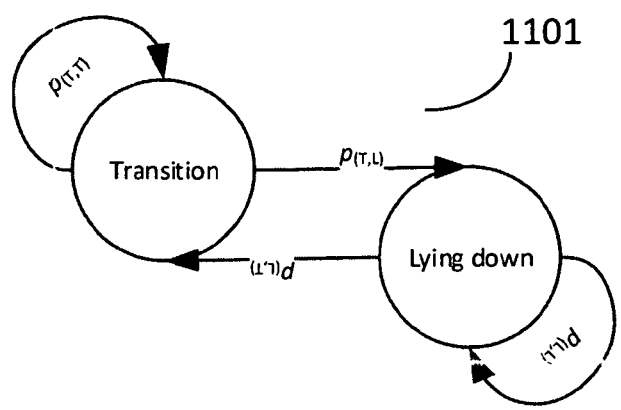
FIG. 11 shows a block diagram of state transition for lying down and performing exercise in an embodiment of the present invention.

FIGS. 9 to 11 shows the three-phase state transition diagram of each of the typical sub-scenarios using a state transition diagram. For illustration purpose, three states (i.e., walking as the pre-fall state represented by letter 'W', falling as the falling state (represented by letter 'T') and lying on the floor as the post-fall state which is represented by letter 'L'. Note letters 'W', 'T' and 'L' are arbitrary and can be replaced by any constant numerical values such as W=2, T=1, and L=0) are used as examples. FIG. 9 shows a typical falling activity state transition model 901. State transition represents the possibility of transitioning from one state to another. For each state, there are multiple state transition probabilities. The user could continue in the current states or it could move to a new state (for each activity only phew states are allowed for transition). Each of these actions is governed by a state transition probability (p(I,J)) i.e., the probability of transitioning from state 'I', to state 'J'. Since it is probability, sum of all such transition probabilities for any state should result in 1. In a typical fall down scenario, the starting phase represents walking or standing, the output of C1 emits 'W'. The user can stay in this state with a probability of p(W,W) or move to a next possible state 'T' with a probability p(W,T). Note that p(W,W)+p(W,T)=1. During this phase (i.e., the transition), the C1 emits letter 'T'. Though short, during falling, the user remains in this state for a while. Probability p(T,T) represents the probability for state to be in 'T'. Finally when landed on the floor, the C1 outputs it as a lying activity 'L'. Again, transitioning from 'T' to 'L' is parameterized in p(T,L) probability. Only allowed transition from 'T' to another state is to 'L'. These three states are the actual hidden states needed to be estimated. In essence, the falling down case (FIG. 9), the state can transit only from 'W' to 'T' to 'L' or it can stay in the current states. The table associated with FIG. 9 shows the summary of the state transition matrix with each cell representing probabilities of transitioning from a state (represented by left column in the table) to any other states (represented by first row in the table). A value '0' represents prohibited state transitions.

On the other hand, with reference to FIG. 10, during sit-up activities 1001, the transit is possible from walking state to the transition state and vice-versa. i.e., the state transition has only two states now. When the user is in stand up condition, the first set of classifier detects it as 'W' and the user could stay there with a probability of p(W,W) or it can move to the next possible state 'T' with a probability of p(W,T). When the user is in transition stage (i.e., he/she is sitting down or moving up), he can stay in that state with a probability of p(T,T) or move to the other allowed state 'W' with a probability of p(T,W). A completely different state transition model is observed for the lying down and performing some exercise activities 1101. In this case possible state transition is between 'T' and 'L' and no occurrence of 'W' is observed (FIG. 11). The two activities are significantly different when compared to the fall down case. A more complex model can be implemented by assuming arbitrary hidden states; that is, observation and hidden stated does not have to have a one to one relationship. Similar model is assumed in C1.

The following tables show the training procedure of the two-layer classifiers C1 and C2. With training, the objective is to estimate appropriate parameters for the classifier. For C1, there are three sets of parameters that are needed to be estimated. It is assumed that the number of state involved is n and m Gaussian distributions are responsible for the generation of the raw observations. With these (n and m) fixed, the training is performed to estimate the state transition matrix (of n×n dimension), mixing probabilities (n×m dimension) and parameters for Gaussian distribution, means and variances. Since there are two classes, there are two or more C1 being trained with two or more unique sets of training data. C1 is trained with raw features of samples recoded form walking activities. The other C1 is trained with raw features of the samples recoded from transition activities of fall. In each case, multiple instances of the raw features (which are recoded with different users at different time) are used for training. Each training step (which uses expectation maximization for the training), the logarithm of the likelihood (log likelihood) is computed. When the log likelihood converges to a fixed value, the training is deemed to be over. In practice, this is achieved by comparing the log likelihood obtained from the current training step with the previous one and see if there is any significant difference. In the testing (or in live detection), the raw observation is presented and corresponding log likelihood is computed. The C1 that has the largest log likelihood is selected and corresponding class is considered to be responsible for generating the raw data.

On the other hand, C2 has two sets of parameters to estimate: the state transition probability and emission probability (which is the probability of observing the discrete observation provided the system is in particular hidden state). To train C2, the output of C1 is collected for different scenarios. A different expectation maximization method is formulated and implemented for this training. In case of three sub-scenario detection, three discrete C2 are trained with different observations obtained from each of these sub-scenarios performed by the user. During the testing phases, the same discrete data is presented to the three C2 and log likelihood is computed. The class that gives the highest value is selected as the current sub scenario.

The flexibility of this architecture is the ability to get a level of confidence of the current classification by observing the log likelihood. For each class, just after the training, the log likelihood is computed for individual classes with the training data. For each class (assume multiple observations), the largest log likelihood value will be stored for the future use. During the test or live detection, when a particular C1 or C2 is selected, the computed log likelihood value will be compared against this stored value. If the estimated value is significantly lesser than the stored one, it means the current sub scenario estimation is of lesser confidence and if this value is greater or close to the stored one, it represents a stronger confidence in the classification.

| First layer (C1) | |
| --- | --- |
| Input | Feature vectors characterizing the movement and trajectory |
| Method | Train each one with different sets of data |
| Convergence | If the estimated log likelihood from the current iteration differs less than a threshold with the likelihood computed from the previous iteration |

| Second layer (C2) | |
| --- | --- |
| Input | Buffer containing 'W' 'T' 'L' (2, 1, 0 in numerical terms) |
| Method | Train each HMM with different sub-scenarios. Observations are stacked and presented to the system |
| Convergence | If the estimated log likelihood from the current iteration differs less than a threshold with the likelihood computed from the previous iteration |

Figure 12:
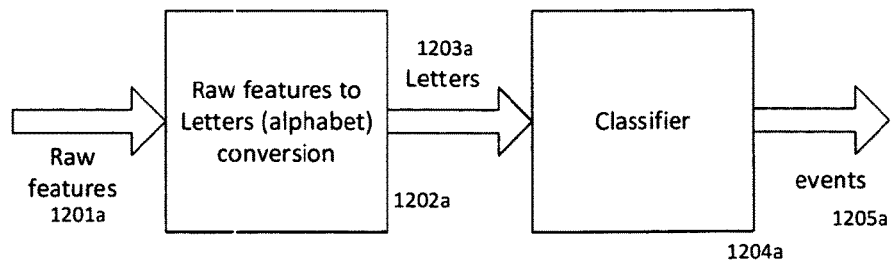
FIG. 12 shows a two-layered HMM based falling down situation assessment algorithm in an embodiment of the present invention.
Figure 12:
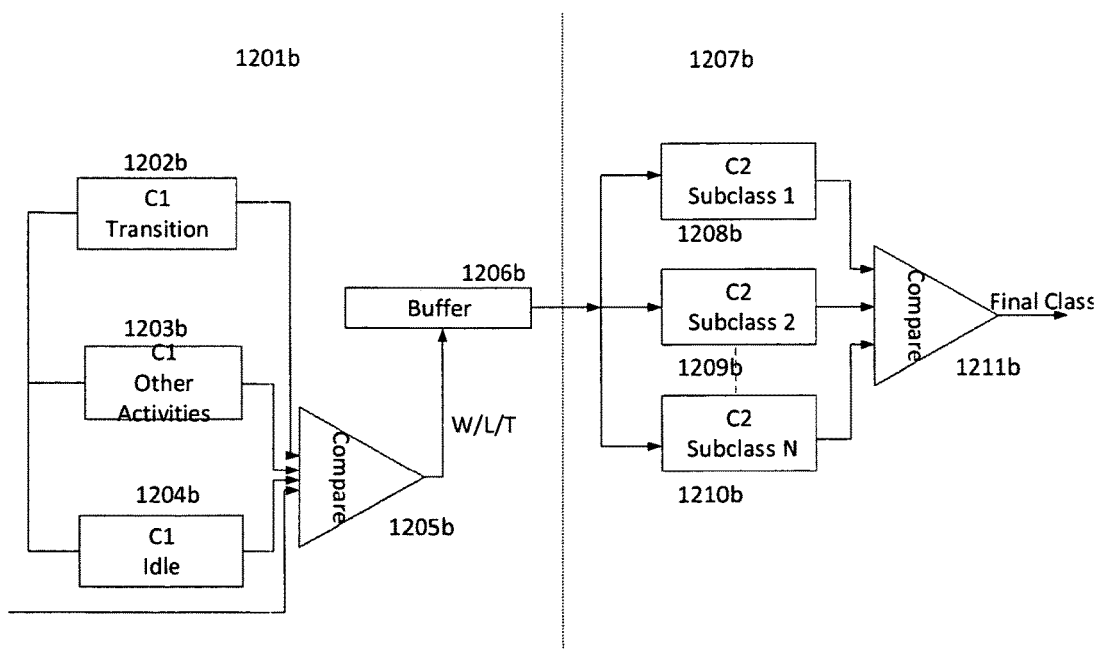

FIG. 12a demonstrates the overall framework of the two-layered scheme in which raw observations 1201a are first converted to letters 1203a of a predefined alphabet by an appropriate classifier 1202a. The second classifier 1204a then takes these letters and classifies to appropriate event classification 1205a. The specific case of these classifiers are discussed now which is shown in FIG. 12 (b). The stage 1 classifier of FIG. 12 (a) is implemented in 1201b using a-set of C1 and a comparator 1205b. The second, sets of classifiers implemented in 1207b are built on C2 and a comparator 1211b. The raw observations (typically the velocity of different features) are fed to C1 (which are trained with different scenarios. For example, first C1 1202b is trained with transition cases and other two C1 (1203b and 1204b) are trained for walking/moving and idle activates, respectively) and the log likelihood is computed. A comparator is used to compare the output of all these C1s. If the C1 corresponding to the transition is selected, the comparator outputs a letter corresponding to 'T'. If any other C1s have higher log likelihood, the other feature which is the centroid of the user is compared against it. A higher centroid than a predefined value forces the system to emit letter 'W' or else it emits 'L'. This is passed to a buffer 1206b and is used by the second level of classifier. The length of this buffer is predefined. The second level of classifiers 1207b are based on the C2s (1208b, 1209b and 1210b) and trained according to the method defined above. For each class to train C2, buffer of fixed or variable length is stacked together and presented to each C2. Each C2 is trained with a particular sub scenario. In the live detection, buffer content from 1201b is input to C2 and corresponding log likelihood is computed. The comparator 1211b compares the output and selects the largest of the log likelihood. The class associate with the C2 that has the largest log likelihood is taken as the recognized event.

In addition, this hierarchical modeling of high-level activities makes recognition systems to incorporate the knowledge much easier. The knowledge is included in the system by listing semantically meaningful sub-scenarios composing a high-level event and/or by specifying their relationships (i.e., rule engine). This allows the DSE flexibility to incorporate additional high-level events without introducing algorithm redesign. As a result, higher level situations are easily extended (i.e., added, removed, re-synthesized) by adding different rules based on the lower-level outputs, enabling automated and/or semi-automated behavior learning capability according to the operators customization.

The hierarchy characterizes the rule-based engine, with integration of prior knowledge 308 and mapping information 303 (if applicable) (as shown in FIG. 3). The lower level rules may include primitive event rules (e.g., enter, appear, exit, disappear, move, stop, move fast/slow, stay long/short etc.), interaction event rules (e.g., occlusion (merge), split etc.), sub-scenario or action rules (e.g., walking, lying down, lying down abnormally, standing (still), sitting (still), lying (still), standing up, sitting down, approaching an object, leaving an object, bending, falling down etc.).

Figure 13:
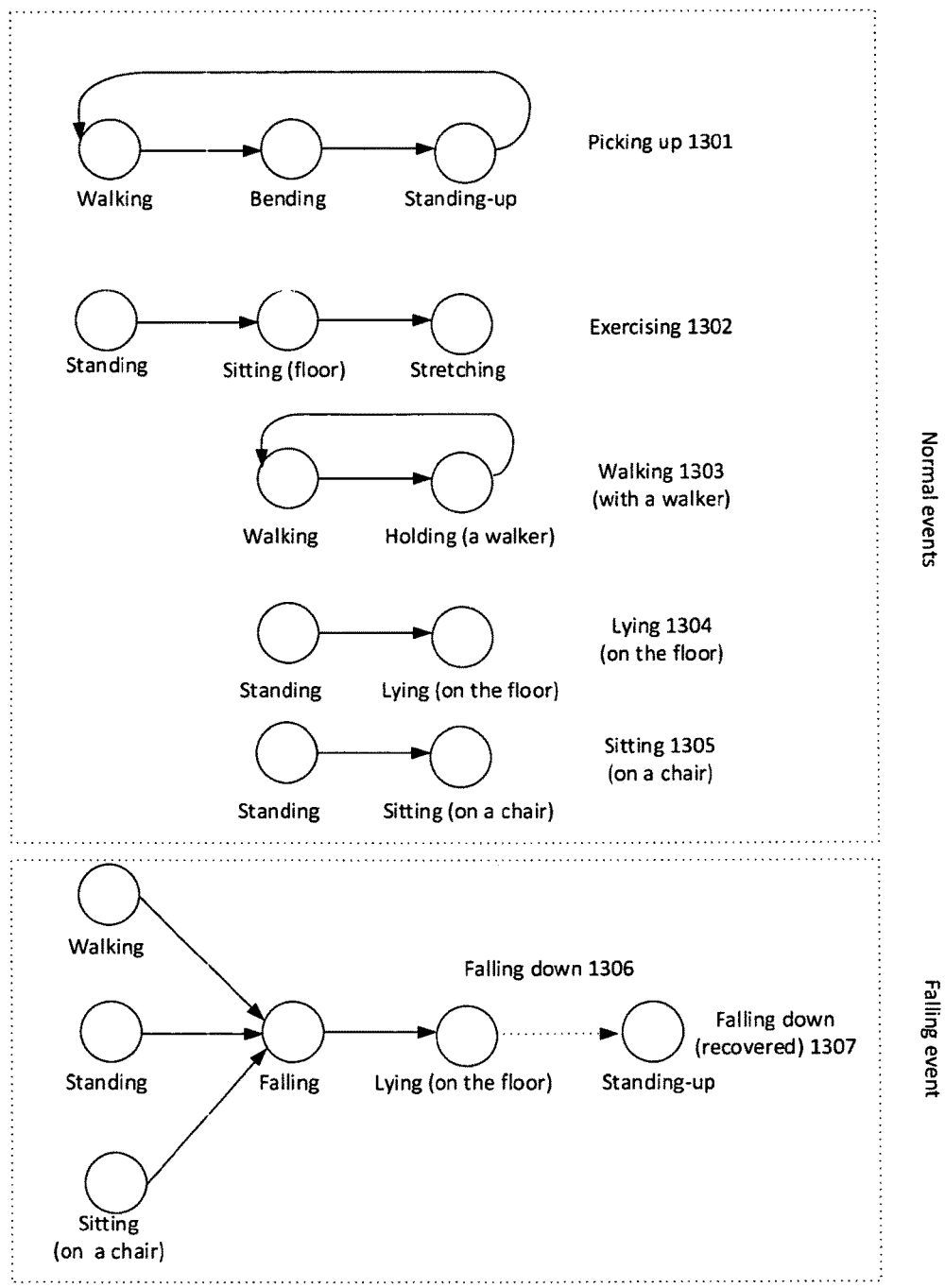
FIG. 13 shows a rule engine of state transitions for normal and falling events recognition in an embodiment of the present invention.

FIG. 13 illustrates a list of typical state transitions rules leading to highest-level events corresponding to the rule engine in FIG. 8. The events defined in the rule engine is divided into normal events and falling events. In one embodiment, the normal events may be composed of picking up 1301, excising 1302, walking 1303, lying 1304, and sitting 1305. For example, the picking up event 1301 may be a sequence of walking, bending and standing up and then walking. The exercising event 1302 may be a sequence of standing, sitting (on the floor) and stretching. The walking (with a walker) event 1303 may be a sequence of walking, holding a walker and then walking. The lying down event 1304 may be a sequence of standing and lying (on the floor). The sitting on the chair event 1305 may be a sequence of standing and sitting (on a chair). For the falling down events 1306, the combination of the sequence is multiple, all leading to the same falling events. For example, the pre-falling sub-scenario could be walking, standing or sitting (on a chair). The post-fall sub-scenario may be a single state, such as lying on the floor, or a sequence of states, such as standing up and walking, which indicates a successful post-fall recovery 1307. One advantage of this hierarchical approach, is its ability to recognize high-level events with more complex structures. This approach is especially suitable for a semantic-level analysis of interactions between humans and/or objects, such as a human walking with a walker, or a human sitting on a chair etc. By encapsulating structurally redundant sub-scenarios shared by multiple high-level events, the hierarchical framework models the high-level events with a lesser amount of training and recognizes them more efficiently. The paradigm of hierarchical representation not only makes the recognition process computationally tractable and conceptually understandable, but also reduces redundancy in the recognition process by re-using recognized sub-scenarios multiple times. For example, from FIG. 13, the sub-scenarios walking and standing are re-used multiple times to distinguish different events.

Furthermore, instead of a "hard" decision for high-level situations, the normal events and falling events are recognized with their associated "soft" uncertainty indicators (i.e.; probabilities). The uncertainty indicators imply the probability of occurrence of the underlying events at a certain period of time and they propagate with time. From the two-layered situation assessment architecture, the high-level events are decomposed into a group of sub-scenarios with different "confidence" levels inside the semantic representation. The increase or decrease of the "confidence" levels depends on two factors (1) time involved, and (2) newly detected sub-scenarios which support the confidence variations. As such, the DSE is able to distinguish between normal events, potential abnormal events (i.e., falling but get recovered), and abnormal/dangerous events (i.e., falling without recovering). At run-time, the DSE continuously adjusts each sub-scenarios "confidence" level for further decision making.

4 Resource Management

Due to the uncertainties from the sensed environment and/or the sensor data itself, the DSE may not consistently deliver the similar level of 'confidence' for all recognized events. There are a number of situations where the system requires additional "evidence" to support its decision making process to confirm its decision. The uncertainties may be a result of varying lighting conditions such that in an entirely dark room the color video information is unavailable. Or the probabilities of certain event recognition are close to the boundary of 'confidence' level which may be due to the occlusion or partially occlusion of the human by an object. One of the major features of the approach is its capability of introducing external context or knowledge at any instance of decision making process. A resource management module in the DSE framework (FIG. 2) is used to realize an automated resource allocation in order for acquiring the additional knowledge to facilitate more robust and reliable decision support. This resource management function takes effect when DSE detects an unknown but potentially suspicious event with low "confidence" which requires more evidences to make further decisions. It will also get triggered when the partial sensor failure occurs.

To implement the resource management functionality, a smart home controller is designed and integrated along with the sensor as shown in FIG. 1. In one embodiment of this invention, the smart home controller controls the external resources or additional sensors, equipment and devices that work all together to provide the required information when necessary. The resource management module can be enabled in the following scenarios, for example:

The color video sensor detects that the distance of a human falls out of the 'confident' interval of the ranging sensor. The resource management module then requires the color video sensor to compensate for the loss of performance by fusing both sensor features.

The color video sensor detects that the level of lighting is below a certain threshold (i.e., too dark) when a certain event such as falling down is detected. The resource management module then powers a light on via the smart home controller, records a video, and sends it to remote operators via a secured network. The remote operators are able to playback the video to make the final decision, or communicate directly with the human on the scene via a point-to-point voice/video communication channel.

The color video sensor detects a falling down event which is near the boundary of the 'confidence' level required to make an assertion, for example, 75% of confidence compared to an 80% assertion confidence. This may be due to the partial occlusion by an object from the angle of view of the primary operating sensor. An auxiliary sensor within the network from a different viewing angle can be requested to make a secondary decision on the recorded video. The recognition results will feed back to the DSE to provide a combined situation assessment for decision support.

5 Software Implementation of the DSE for Fall Detection

To this end, the DSE implements a real-time, hierarchical-layered approach for automated fall recognition. The software implementation is applied to multiple humans in the scene, where multiple falling downs can be recognized simultaneously. The design logic could be such that if all humans are recognized as falling down, the system will trigger an alarm. If there is one or more than one human is detected as not falling, the system will remain without any alarms, no matter whether there is another falling or not. The following pseudo program shows an example of the overall design logic to implement a multi-human fall detection, interaction of floor parameters by floor detection, and simple resource management by powering a light on.

```
SET const MAX_USERS, FALLING_CHECK, INACTIVITY_CHECK,
NO_FALLING_FRAME_CHECK, NO_INACTIVITY_FRAME_CHECK, DELAY_MILISECOND
SET threshold Tplane
SET counter falling_count[MAX_USERS], inactivity_count[MAX_USERS],
clear_falling_count[MAK_USERS], clear_inactivity_count[MAX_USERS]
SET boolean activity_detection[MAX_USERS] = false, inactivity_detection[MAX_USERS] =
false, fall_detection[MAX_USERS] = false, light_on[MAX_USERS] = false
while run do
    detect plane of the scene
    detect number_of_users in the scene
    detect centroid of all the users
    compute centroid_to_plane, i.e., the distance from the centroid to the plane of all the users
    detect blobs of all the users
    compute extracted features for all the users
    for each user in the scene
        reset = false
        if (FALLING [user] == true)
            if (falling_count[user] == FALLING_CHECK)
                activity_detection[user] = true
            end if
            falling_count[user]++
            clear_falling_count[user] = 0
            inactivity_count[user] = 0
            clear_inactivity_count[user] = 0
        else
            clear_falling_count[user] ++
        end if
        if ((activity_detection[user] == true) and (FALLING [user]==true) and
        (centroid_to_plane[user] < Tplane))
            if (inactivity_count[user] == INACTIVITY_CHECK)
                    inactivity_detection[user] = true
                    fall_detection[user] = true
            end if
            inactivity_count[user] ++
            clear_inactivity_count[user] = 0
        else
            clear_inactivity_count[user] ++
        end if
        if (clear_flling_count[user] > NO_FALLING_FRAME_CHECK)
            falling_count[user] = 0
            clear_falling_count[user] = 0
        end if
        if (clear_inactivity_count [user] > NO_FALLING_FRAME_CHECK)
            inactivity_count[user] = 0
            clear_inactivity_count[user] = 0
        end if
        if ((fall_detection[user]) and (centroid[user] < Tplane))
            reset = true;
        end if
        if reset
            falling_count[user] = 0
            clear_falling_count[user] = 0
            inactivity_count[user] = 0
            clear_inactivity_count[user] = 0
            activity_detection[user] = false
            inactivity_detection[user] =false
            fall_detection[user] = false
            light_on[user] = false
        end if
        if ((fall_detection[user] == true) in DELAY_MILISECOND)
            light_on[user] = true
        else
            light_on[user] = false
        end if
    end for
    if (any light_on == true)
        turn on the light
    else if (all light_on == false)
        turn off the light
    end if
end while
```

Figure 14:
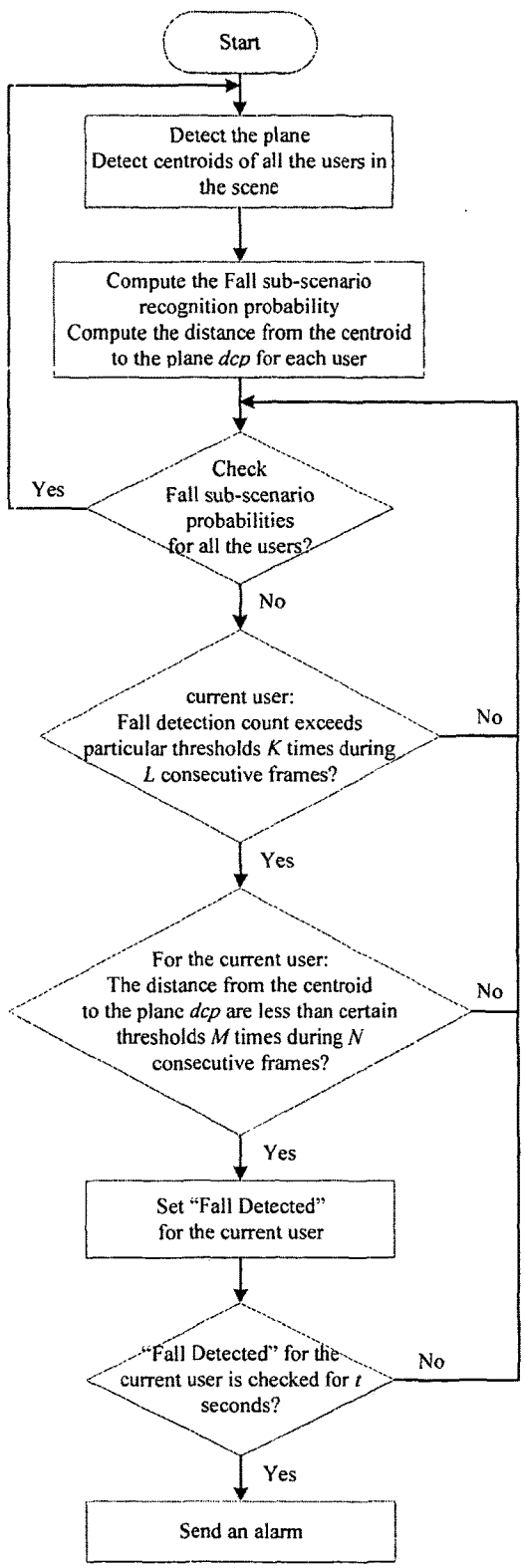
FIG. 14 shows a block diagram of an overall fall down recognition process in an embodiment of the present invention.

FIG. 14 illustrates a block diagram of the overall fall down recognition process in DSE by incorporating the multi-layered classification approach and the context information. Following the program start 1401, the first block detects and maps the floor plane in 1402 using the floor detection algorithm. The second block in 1403 realizes the human detection, human tracking and feature extraction. The next seven blocks realize step-by-step the strategy of raising a flag of fall detection using the detected events and the related contextual information. In one embodiment, for each user in the scene, the falling event is computed using the proposed multi-layered approach for L consecutive frames at 1404. When the falling event recognition count exceeds the thresholds K times, the fall initiation for the user is triggered. Then an inactivity state is checked at 1405 to differentiate between the dangerous fall and fall with successful recovery. By comparing the distance from the user centroid to the plane of the floor at 1406, no motion occurs if both of them are less than predefined threshold M times during the next N consecutive frames. "Fall detected" flag is set on at 1407 if following the fall initiation state is an inactivity state. Once "Fall detected" flag is trigged, the procedure waits for a predetermined time at 1408, i.e., t seconds before allowing the system to send an alarm to the responsible people. The last block 1409 implements the alarm and resource management system. In one embodiment, the system may turn on the light by using a smart home device and/or start recording the video file once a fall activity is detected. In another embodiment, the resource management system is triggered to allocate one or more resources to request for further evidence in the next detection loop.

While the invention has been described in terms of a single preferred embodiment, any use of singular or specific terms includes all similar terms as is known in the art of the specific term.

The invention claimed is:

1. A system for event detection and reporting, comprising:
   a plurality of primary sensors for producing raw data from observing the proximate area, a one or more processors for the primary sensors, for processing the raw data to produce output;
   a centralized controller to which each of the processors is connected, for receiving the output;
   a security network for communicating between the sensors, the controller, and one or more remote terminals, the security network having an alarm;
   and
   a plurality of auxiliary sensors for providing secondary sensor information to the one or more processors wherein the controller provides an alarm to the remote terminals through the security network if an event has occurred;
   and
   a knowledge base containing the contextual information of the scene for assisting the decision making process of the processor.

2. The system of claim 1 the one or more processors each comprising:
   a. a sensor processing module which processes the sensor output;
   b. a recognition module in communication with the sensor processing module, for recognizing sub-scenarios to produce sub-scenario information;
   c. a situation assessment module for receiving sub-scenario information from the recognition module and determining if a recognized event has occurred;
   and
   d. a resource management module for allocating control commands.

3. The system of claim 2, wherein sub-scenarios are hierarchically organized to represent one or more events, and the one or more processors each further comprise:
   a situation assessment framework for recognizing events;
   one or more models used for calculating parameters of a scene of interest;
   and
   one or more run-time decision feedback from one or more auxiliary sensors.

4. The system of claim 2 wherein each output of the situation assessment module is given a confidence level of the detected event, which confidence level is adjustable by accumulating the probability values over a number of frames and determining one or more newly-detected sub-scenarios to support the confidence level.

5. The system of claim 2 wherein, when a detected confidence level is lower than a predefined confidence threshold, the resource management module senses the status of all available resources and calculates an optimal utility plan for all available resources, and the resource management module allocates one or more list control command.

6. The system of claim 2, wherein one or more processors perform sub-scenario level processing, wherein one or more sub-scenarios are recognized by one or classifiers and the subset of action items comprising one or more events are recognized.

7. The system of claim 2, wherein one or more processors perform higher level event processing formed by a sequence of sub-scenarios with proper context information, wherein one or more events are recognized using a multiple layer situation assessment processing.

8. The system of claim 1, wherein the one or more processors perform detection level processing of raw data obtained from the sensors and contextual information of the knowledge base, wherein the human is detected and represented by a set of features.

9. The system of claim 1, wherein one or more processors perform feature level processing, wherein the raw data and context information are converted and extracted as abstract features,
   and
   wherein the abstract features are obtained from the contextual information.

10. The system of claim 1, wherein one or more processors perform situation assessment for high-level event recognition using multi-level classification.

11. The system of claim 1, wherein one or more processors construct a state transition model to represent the possibility of transitioning from one state to another, the state transition model comprising:
    a. two or more states are constructed to represent recognized sub-scenarios and the context information;
    b. one or more probability values are adapted to associate with each state as an initial state probability;
    c. one or more probability values are adapted to associate with each combination of two states indicating a probability of transition from the first state to the second state as the state transition probability;
    and
    d. one or more probability values are adapted to associate with each state indicating a probability of remaining in each stale as another state transition probability.

12. The system of claim 1, wherein one or more processors recognize events by associating raw features and abstract features with characters representing one or more sub-scenarios, and the characters are associated with the events by one or more classifiers in the second layer.

13. The system of claim 1, wherein one or more processors compute a set of likelihood values from one or more classifiers in the first layer, the likelihood values are compared with each other in a comparator in the first layer, and the largest likelihood value and its associated stale is selected.

14. The system of claim 1, wherein one or more processors select a largest likelihood value by inputting a set of likelihood values from the buffer to one or more classifiers in a second layer, calculating a set of likelihood values from one or more classifiers in the second layer, and comparing the likelihood values with each other in the comparator, and selecting the largest likelihood value and its associated sub-scenario.

15. The system of claim 1, further comprising a rule engine having primitive event rules, interaction event rules, sub-scenario rules and activity rules, which integrate with the knowledge base information.

16. A method of event detection and reporting, comprising the steps of:
receiving a control command from one or more processors;
receiving an alarm message from the one or more processors;
receiving sensor information from one or more sensors, The one or more sensors having color and non-color sensor features detecting an object of interest falling out of the confidence interval of the range sensor a resource manager compensating for the loss of performance by means of fusing both color and non-color sensor features;
the one or more processors determining if an event has occurred by considering one or more of the control command, the alarm message and the sensor information;
the one or more processors sending one or more alarm messages and filtered sensor information to one or more remote terminals if an event has occurred;
the one or more processors sending one or more control commands to a smart home controller if an event has occurred;
receiving decision feedback from a remote terminal; and
directing one or more of sensor information, intermediately recognized events and control commands to the terminal to address the decision feedback.

17. The method of claim 16, further comprising:
analyzing the scene;
detecting and mapping an object;
detecting motion;
extracting features;
detecting humans;
reconstructing human body parts;
and
tracking multiple humans.

* * * * *